Dec. 23, 1952      H. J. FERGUSON      2,622,721
CONVEYER

Filed Nov. 14, 1947      2 SHEETS—SHEET 1

*INVENTOR.*
HARRY J. FERGUSON

ATTORNEY.

Dec. 23, 1952  H. J. FERGUSON  2,622,721
CONVEYER
Filed Nov. 14, 1947  2 SHEETS—SHEET 2
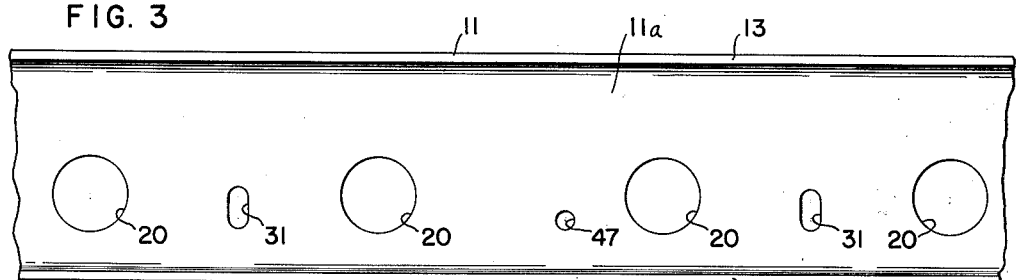
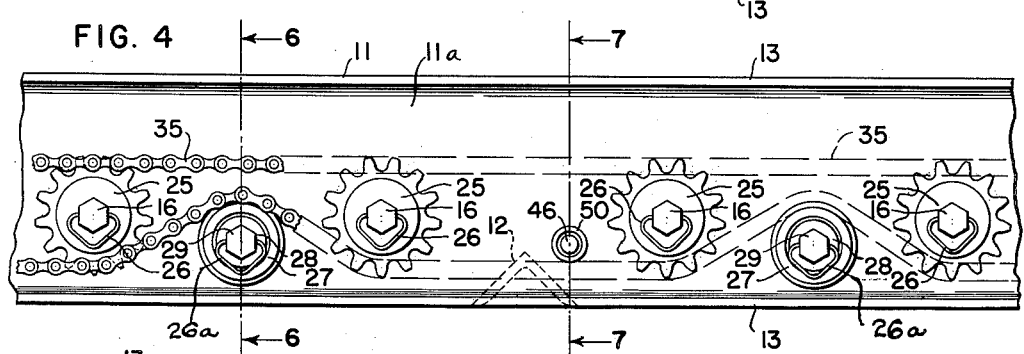
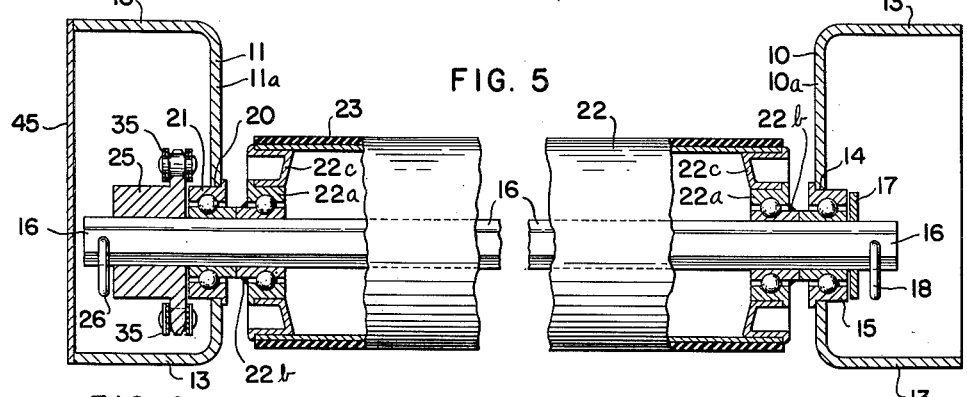
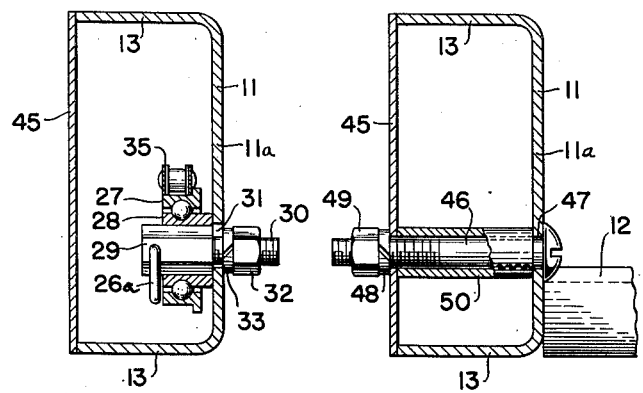
*INVENTOR.*
HARRY J. FERGUSON
BY
ATTORNEY.

Patented Dec. 23, 1952

2,622,721

UNITED STATES PATENT OFFICE 2,622,721

CONVEYER

Harry J. Ferguson, Elkins Park, Pa., assignor to Harry J. Ferguson Co., Jenkintown, Pa., a corporation of Pennsylvania Application November 14, 1947, Serial No. 786,005

4 Claims. (Cl. 198—127)

1

This invention relates to conveyors and more particularly to conveyors of the live roller type and to curves therefor.

It has heretofore been proposed to provide conveyor curves having conveying rollers power operated from a suitable motor. The structures for this purpose have not, however, proven satisfactory. In the conveyor curves heretofore proposed, in which the rollers were power operated, friction belts have been employed, either as flat belts or as V belts, in engagement between the side rails with the rollers. The stretching or wearing of the belts which occurs results in operating difficulties within a very short interval of time. Other conveyor curves with power driven rollers have also been proposed, but these have also proven unsatisfactory under operating conditions.

It is the principal object of the present invention to provide an improved live roller conveyor and more particularly such a conveyor in the form of a curve in which the rollers are positively driven.

It is a further object of the present invention to provide a conveyor curve of the character aforesaid which is reversible in its operation, if desired.

It is a further object of the present invention to provide a conveyor curve of the character aforesaid which may be constructed and assembled in units of a predetermined angle, such as 90 degrees, 180 degrees or any other desired angle.

It is a further object of the present invention to provide a conveyor curve of the character aforesaid in which the operating parts are adequately protected for eliminating operating difficulties and for preventing injury to the user.

Other objects and advantageous features will be apparent from the specification and claims.

The nature and characteristic features of the invention will be more readily understood from the following description taken in connection with the accompanying drawings forming part hereof, in which:

Figure 1 is a top plan view of a conveyor curve in accordance with the present invention;

Fig. 2 is a fragmentary plan view, enlarged, of a portion of the conveyor curve shown in Fig. 1, parts being broken away to show the details of construction;

Fig. 3 is a fragmentary view of a development of a portion of the outside rail of the conveyor curve prior to assembly;

Fig. 4 is a fragmentary view of a development of a portion of the outside rail with the operating parts mounted thereon;

Fig. 5 is a transverse sectional view taken approximately on the line 5—5 of Fig. 2;

Fig. 6 is a transverse sectional view taken approximately on the line 6—6 of Fig. 4; and Fig. 7 is a transverse sectional view taken approximately on the line 7—7 of Fig. 4.

It should, of course, be understood that the description and drawings herein are illustrative merely, and that various modifications and changes may be made in the structure disclosed without departing from the spirit of the invention.

The conveyor curve in accordance with the present invention preferably comprises one or more arcuate sections each of 90 degrees, and connected, if more than one section is employed, as hereinafter explained.

Referring now more particularly to the drawings, the conveyor in accordance with the present invention preferably includes for each arcuate section spaced and alined curved inner and outer rails 10 and 11, the rails 10 and 11 being held in spaced relationship by cross braces 12 at suitable locations. The rails 10 and 11 may be of any desired cross section, but are preferably formed as channels with vertical webs 10a and 11a and horizontal upper and lower flanges 13.

The web 10a of the inner rail 10 is preferably provided, at spaced locations, with openings 14 in which ball bearings 15 are mounted for the reception of hollow shafts 16, preferably hexagonal in cross section. Washers 17 on the ends of the shafts 16 are held in place by split rings 18. The web 11a of the outer rail 11 is also provided with openings 20 in alinement with the openings 14 of the inner rails 10, and have ball bearings 21 mounted therein for the reception of the outer ends of the shafts 16.

Each of the shafts 16 has fixedly mounted thereon, in any desired manner, a roller 22 preferably consisting of a length of tubing and, if desired, the tubing may have on the outer face thereof and secured thereto by vulcanizing or in any other desired manner, a friction surface covering 23 of rubber or like material. A suitable mounting for each roller 22 may consist of a ball bearing 22a at each end on the shaft 16 with the movable parts held against rotation by welding 22b and carrying a collar 22c in engagement with the interior and end of the tubing.

On the outer ends of each of the shafts 16 beyond the web 11a and within the outer rail 11, a toothed sprocket 25 is provided, rotatable with the shaft 16, for driving the shaft and the roller 22 carried thereby. The sprockets 25 are preferably maintained against endwise displacement by split rings 26, removably inserted in the shafts 16.

At spaced intervals along the outer rail 11, idler flanged rollers 27 are provided, rotatably mounted on ball bearings 28, the bearings 28 in turn being mounted on stub shafts 29 having threaded extensions 30 extending through vertically elongated slots 31 in the web 11a. The slots 31 permit of adjustment of the positions of the idler rollers 27 and the stub shafts 29 are held in adjusted position by nuts 32 and lock washers 33 on the threaded extensions 30 thereof and the bearings 28 are held on the shafts 29 by split rings 26a. On each section, and in engagement with the toothed sprockets 25 and the idler rollers 27, an endless roller chain 35 is provided for positively driving the rollers 22 in unison.

One of the shafts 16, such as the shaft at the end of the section, has an inward extension 16a on which a sprocket 36 is mounted. The sprocket 36 is connected by a driving chain 37 of the roller type to a sprocket 38 on a speed reducer 39 which is in turn operated by an electric motor 40 mounted on a horizontal frame 41. The motor 40 is preferably reversible and for this purpose a motor controller 42 is provided connected to the motor 40 by a suitable conductor cable 43 having an operating handle 44, the controller handle 44 being adapted to have three positions—for forward movement, for stop, and for reverse movement.

A guard plate 45 is provided for closing the ends of the flanges 13 of the outer rail 11. The plate 45 is held in position by bolts 46 extending through openings 47 in the web 11a of the rail 11 and through the guard plate 45. The bolts 46 at their outer ends carry lock washers 48 and nuts 49, spacers 50 being provided for spacing the plate 45 intermediate its upper and lower edges.

The side rails 10 and 11 are adapted to be supported by suitable vertical legs 51 which may be of the same height or which may be of different heights to elevate one or the other end of the conveyor curve in the usual manner.

The structure heretofore described is particularly applicable to 90 degree curves, and if a curve for a larger angle is desired one or more similar units may be employed, having inner and outer side rails 10 and 11 and driven rollers 22 mounted and chain connected within the outer rail 11 and driven as heretofore explained. The arcuate sections are connected at their adjoining ends by bolts 55.

The shaft 16 of the end roller 22 of one section adjacent the end roller 22 of the next section has on the inward extension 16a thereof a sprocket 52, and a chain 53 is provided in engagement with the sprocket 52 and with a sprocket 54 mounted on an inward extension 16b of the shaft 16 at the end of the next section for driving the roller 22 thereon and, through the shaft 16, and a chain 35 on sprocket 25, the remaining rollers 22 of the additional section.

I claim:

1. A reversible power driven conveyor curve comprising spaced horizontal arcuate rails each having arcuate vertical webs, a plurality of hollow cylindrical article supporting rollers extending radially between said webs, shafts radially disposed in the same plane and journaled in said webs and on which said rollers are supported, sprockets carried on the outer ends of each of said shafts, an endless driving chain of the roller type arcuately disposed along the vertical web of the outer rail and having its upper reach in a plane and extending horizontally on the upper portions and its lower reach on the lower portions of said sprockets in driving engagement therewith, a driving motor, and a driving connection between said motor and the inner end of one of said shafts.

2. A reversible power driven conveyor curve comprising spaced horizontal arcuate rails each having arcuate vertical webs, a plurality of hollow cylindrical article supporting rollers extending radially between said webs, shafts radially disposed in the same plane and journaled in said webs and on which said rollers are supported, sprockets carried on the outer ends of each of said shafts, an endless driving chain of the roller type arcuately disposed along the vertical web of the outer rail and having its upper reach in a plane and extending horizontally on the upper portions and its lower reach on the lower portions of said sprockets in driving engagement therewith, a plurality of spaced take-up rollers vertically adjustably mounted on the outer rail web and in engagement with the lower reach of said chain, a reversible driving motor, and driving connections between said motor and the inner end of one of said shafts.

3. A reversible power driven conveyor curve comprising spaced horizontal arcuate rails each having arcuate vertical webs and upper and lower horizontal flanges, a plurality of hollow cylindrical article supporting rollers extending radially between said webs, shafts radially disposed in the same plane and journaled in said webs on which said rollers are supported, sprockets carried on the outer ends of each of said shafts, an endless driving chain of the roller type arcuately disposed along the vertical web of the outer rail between the upper and lower flanges, said chain having its upper reach in a plane and extending horizontally on the upper portions and its lower reach on the lower portions of said sprockets in driving engagement therewith, a plurality of spaced take-up rollers vertically adjustably mounted on said web between said flanges and in take-up engagement with the lower reach of said chain, a driving motor, and driving connections between said motor and the inner end of one of said shafts.

4. A reversible power driven conveyor curve comprising spaced horizontal arcuate rails each having arcuate vertical webs and horizontal upper and lower flanges, a plurality of hollow cylindrical article supporting rollers extending radially between said webs, shafts radially disposed in the same plane and journaled in said webs on which said rollers are supported, sprockets carried on the outer ends of each of said shafts, an endless driving chain of the roller type arcuately disposed along the vertical web of the outer rail and between the upper and lower flanges, said chain having its upper reach in a plane and extending horizontally on the upper portions and its lower reach on the lower portions of said sprockets in driving engagement therewith, a plurality of spaced flanged take-up rollers carried by said web between said flanges and vertically adjustable on said web in take-up engagement with the lower reach of said chain, a guard plate extending between the flanges of the outer rail and enclosing said sprockets, said chain, and said take-up rollers, a reversible driving motor, and driving connections between said motor and the inner end of one of said shafts.

HARRY J. FERGUSON.

REFERENCES CITED

The following references are of record in the file of this patent:

UNITED STATES PATENTS

| Number | Name | Date |
|---|---|---|
| 100,710 | Bachelder | Mar. 15, 1870 |
| 445,290 | Treat | Jan. 27, 1891 |
| 1,795,192 | York | Mar. 3, 1931 |
| 1,831,015 | Le Mare | Nov. 10, 1931 |
| 1,896,150 | Zademach | Feb. 7, 1933 |
| 1,931,454 | Anderson | Oct. 17, 1933 |
| 2,110,942 | Piquerez | Mar. 15, 1938 |

FOREIGN PATENTS

| Number | Country | Date |
|---|---|---|
| 336,820 | Great Britain | Oct. 23, 1930 |